(No Model.)

J. WITTMANN & N. B. YINGLING.
BELT GEARING.

No. 355,239. Patented Dec. 28, 1886.

Attest
J. Watson Sims
Jno. S. Roebuck Jr.

Inventors
John Wittmann
Noah B Yingling
by Wood & Boyd.
his Attorneys &c

UNITED STATES PATENT OFFICE.

JOHN WITTMANN AND NOAH B. YINGLING, OF SEVEN MILE, OHIO.

BELT-GEARING.

SPECIFICATION forming part of Letters Patent No. 355,239, dated December 28, 1886.

Application filed July 31, 1886. Serial No. 209,677. (No model.)

*To all whom it may concern:*

Be it known that we, JOHN WITTMANN and NOAH B. YINGLING, citizens of the United States, residing at Seven Mile, in the county of Butler and State of Ohio, have invented certain new and useful Improvements in Belt-Gearing, of which the following is a specification.

Our invention relates to improvements in gearing for endless carrier-belts—such as are used in thrashers, stackers, self-binding harvesters, &c.—and has for its object to provide a belt or gearing that will give a more positive motion, with less friction than belts heretofore used for like purposes.

The invention consists in the construction and combination of devices as hereinafter set forth, and illustrated in the accompanying drawings, in which—

Figure 1:
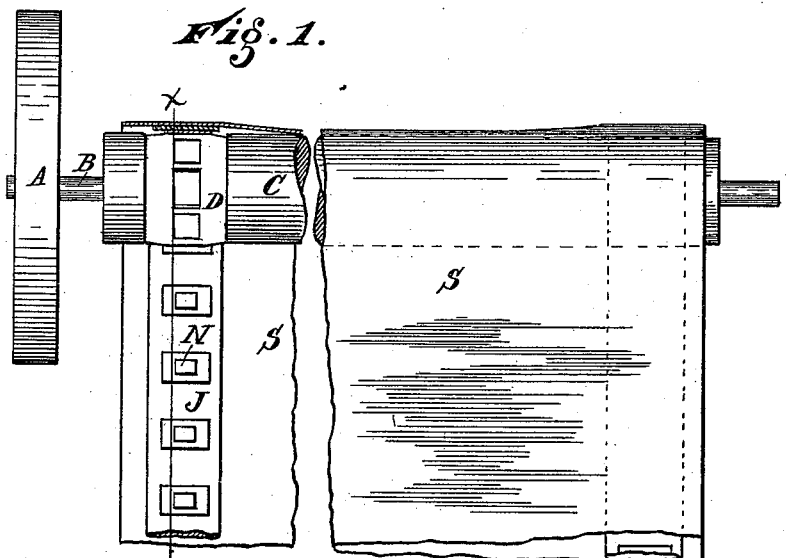
Figure 2:
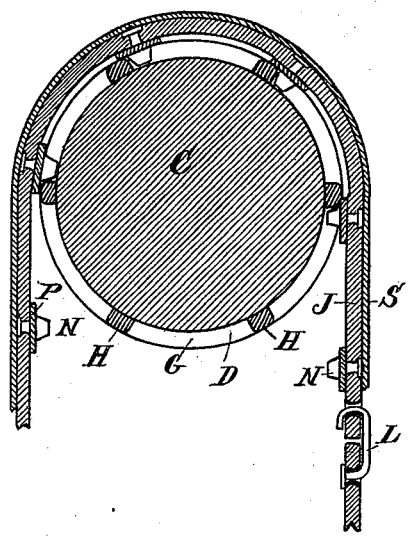
Figure 3:
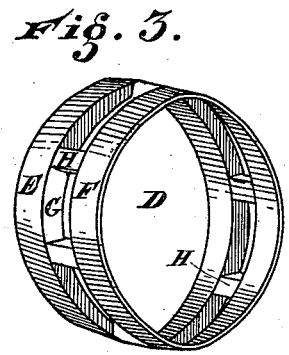
Figure 5:
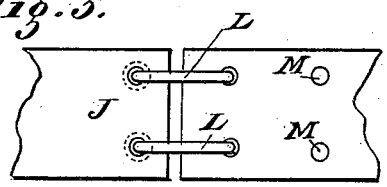
Figure 4:
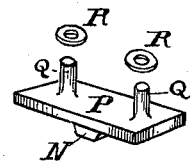

Figure 1 is a plan with a portion broken away to exhibit the inner side of the belt and the collar in position on the shaft. Fig. 2 is a section on line $x\ x$, Fig. 1. Fig. 3 is a perspective view of the belt-carrier. Fig. 4 is a similar view of one of the belt-teeth and the washers used in riveting, and Fig. 5 is a plan of belt-end-connecting devices.

A represents an ordinary pulley; B, the driving-shaft; C, an apron-carrying roller.

D is the belt-carrier, formed of two collars, E F, with central longitudinal slots, G, and connecting-bars H, which engage the teeth on the belt. Each of the collars is thicker at the center than at the edges, and is thus beveled in order to cause the belt to ride in the center, as on an ordinary pulley. We usually make the carrier in two sections, and secure it to the rollers by screws, and we prefer this plan, as it is cheap and convenient; but it may be made in one piece and shrunk on, in the usual manner of shrinking bands on hubs.

J represents a belt, preferably of leather, the ends of which are united by two couplings, L, provided with heads and hooks, and passing through eyelets, as shown. We usually provide one end of the belt with extra eyelets M, so that when it stretches a portion may be cut off and the coupling inserted in other holes.

N represents the belt-teeth, which are cast on an oblong plate, P, which acts as a flange to give a firm bearing on the belt, and is provided with two shanks, Q, of any suitable metal, which pass through the belt, and are riveted over washers R on the opposite side. The teeth are so spaced on the belt as to maintain proper contact with the bars H of the carrier, our preference being to have four of each always engaged, as shown in Fig. 2.

S represents an ordinary carrier-apron secured by any suitable means to the outside of the belts; but it is obvious that instead slats or any other well-known carrier may be employed, or that the belt may be used as a transmitter of power where no carrier is employed.

In self-binding harvesters the roller which drives the apron is necessarily small and cannot afford to be weakened by any cutting away to seat pinions, for experience has shown that when that is done they are almost certain to break. Our improvement has the advantage over all such in that it does not weaken or injure the roller by cutting.

Having thus described our invention, what we claim as new, and desire to secure by Letters Patent, is—

1. The belt-carrier D, consisting of two beveled collars, E F, connected by transverse bars H, whereby said carrier is provided with a series of longitudinal slots, G, substantially as described.

2. The belt-tooth N, cast integral with an oblong bearing-plate, P, having integral shanks Q, adapted to be passed through a belt and secured, substantially as described.

3. The combination of a driving-roll, a belt-carrier mounted on said roll and provided with a series of longitudinal slots, G, and transverse bars H, a belt, J, and the plates P, having teeth N, and shanks Q, substantially as described.

In testimony whereof we have hereunto set our hands.

JOHN WITTMANN.
NOAH B. YINGLING.

Witnesses:
EDWARD BOYD,
ROBERT ZAHNER.